(12) United States Patent
Johnson et al.

(10) Patent No.: US 7,029,050 B1
(45) Date of Patent: Apr. 18, 2006

(54) TAILGATE DOOR ASSIST

(76) Inventors: Glenn Johnson, 36 Village Rd., Beach Lake, PA (US) 18405; Justin M. Pallay, 97 Woodledge Village, E. Lakeside Box 46, Hawley, PA (US) 18405; Kevin Mak, 136 Crestwood Dr., Warren, NJ (US) 07059

( * ) Notice: Subject to any disclaimer, the term of this patent is extended or adjusted under 35 U.S.C. 154(b) by 0 days.

(21) Appl. No.: 11/215,283

(22) Filed: Aug. 31, 2005

(51) Int. Cl.
*B62D 33/03* (2006.01)

(52) U.S. Cl. ................................. 296/57.1; 296/61

(58) Field of Classification Search ................ 296/50, 296/57.1, 61, 146.8, 146.11; 16/72, 76, 78, 16/85; 414/537
See application file for complete search history.

(56) References Cited

U.S. PATENT DOCUMENTS

| | | | | |
|---|---|---|---|---|
| 1,880,870 A | * | 10/1932 | Demo | 16/78 |
| 6,126,223 A | * | 10/2000 | Rayburn | 296/57.1 |
| 6,183,031 B1 | * | 2/2001 | Ballard et al. | 296/57.1 |
| 6,196,609 B1 | * | 3/2001 | Bowers | 296/57.1 |
| 6,550,840 B1 | * | 4/2003 | Rayburn | 296/57.1 |
| 6,964,445 B1 | * | 11/2005 | Bellis, Jr. | 296/57.1 |
| 2002/0070576 A1 | * | 6/2002 | Rayburn | 296/61 |
| 2004/0189036 A1 | * | 9/2004 | Norfleet | 296/57.1 |
| 2005/0127702 A1 | * | 6/2005 | Norfleet | 296/57.1 |
| 2005/0247412 A1 | * | 11/2005 | Bengtsson et al. | 160/265 |

* cited by examiner

*Primary Examiner*—Jason Morrow
(74) *Attorney, Agent, or Firm*—Robert S. Salzman

(57) ABSTRACT

An apparatus for assisting with the handling of a door of a tailgate cart features two springs that are strung in seriatim. The first spring is connected at one end to the tailgate door, and connects to the second spring at its other end. The second spring is anchored at a distal end to the frame of the tailgate cart. The first spring has a shorter length than the second spring. As the tailgate door is pivotally lowered from its upright position, the shorter spring provides a matching small force. As the tailgate door reaches the end of its travel, the second spring adds its force to the first spring, and a greater force is provided to counterbalance the door.

18 Claims, 5 Drawing Sheets

TAILGATE DOOR ASSIST

FIELD OF THE INVENTION

The present invention pertains to gardening equipment, and more particularly to an apparatus for assisting the opening and closing of a door of a tailgate cart.

BACKGROUND OF THE INVENTION

Tailgate carts have become very popular with gardeners and landscapers in recent times. These carts are hitched to a truck, and provide a large cargo area for the storage and transportation of mowers, ladders, tillers, edging tools, weed-whackers, and other gardening and landscaping equipment. These tailgate carts have a low center of gravity, making them very stable in transporting heavy gardening tools. A tailgate cart of the kind that is described above, is shown in U.S. Pat. Nos. 6,183,031; and 6,126,223.

One outstanding feature of these tailgate carts is their large access door. The door is extends many feet above the loading bed, and its bottom is pivotally connected to the base of the tailgate frame surrounding the loading bed. To access the equipment disposed in the bed of the cart, the door is pulled down about its pivots, until the top of the door touches the roadway. In this position, the door acts like a loading and unloading ramp. The equipment is then easily rolled off the cart for the next landscaping job.

The door of the cart is very heavy, and is latticed to reduce its weight for handling purposes. Yet, despite being latticed, the tailgate door is not easily lifted, or lowered.

In the aforementioned U.S. Pat. Nos. 6,183,031; and 6,126,223, spring assist devices for opening and closing the door, are illustrated and described. These spring devices are mounted on the top of the frame of the tailgate bed. The springs are free to extend along the frame. A cable or chain is attached to the springs via a pulley, and as the door is lowered and raised, the springs are caused to extend and contract, accordingly. The extension and contraction of the springs act to counterbalance the force of the pivoting door in accordance with Hook's law: $F=½ K X^2$, where F is the force required to lower and lift the door, K is the spring constant in pounds/foot$^2$; and X is the distance traveled by the spring in feet.

One of the major problems with these assist devices is that the spring acts in a linear fashion to counterbalance the weight of the door. The arcuate motion of the door, however, does not provide a good force match for the linear spring movement. The result is that the lowering of the door is difficult in the beginning, owing to low lateral force component of the gravity vector in the upright position. As the door descends, the lateral component of the gravity force vector increases, and its mid-range force is better matched to the spring force. However, as the door nears the ground, the lateral gravity force vector component is generally decreasing. The poorly matching spring force, thus makes it difficult to smoothly place the top of the door against the ground.

The present invention, seeks to provide a more uniform counterbalancing of the spring force vis-à-vis the lateral force component of the gravity vector of the tailgate door.

The current invention has designed the spring assist device in two different counterbalancing parts, i.e. two springs act in seriatim to give a non-linear force that more closely matches the lateral force component of the gravitational pull of the tailgate door.

The invention has two springs of unequal length disposed in seriatim. When the tailgate door is being initially lowered, the smaller, or first spring shoulders most of the load. As the door reaches a 45° angle with respect to the tailgate base, the second, longer spring begins to shoulder the existing force. As the top of the door reaches the floor, both the first and second springs are fully extended to allow the door to be gently placed upon the ground.

In the equation, $F=½ K X^2$, the extension of the springs of different length and/or different spring constant of this invention, furnish a non-linear response to the non-linear lateral force component of the door.

Another way of achieving the same result would be to use these two springs of unequal length in seriatim, but each would have a different spring constant "K". In other words, the first spring would supply a lower counterbalancing force, than the second spring. In this embodiment, the counterbalancing force pattern would be less in the beginning of the door travel, but greater at the end of the door travel vis-à-vis the first embodiment. In other words, the non-linear response pattern can be molded to more closely fit the force vectors of the tailgate door.

SUMMARY OF THE INVENTION

In accordance with the present invention, an apparatus for assisting the opening and closing of a door of a tailgate cart, is described. The apparatus is comprised of a housing containing two springs connected in seriatim. The springs are coil springs, and generally follow Hook's law. The springs are designed to provide a counterbalancing force for the opening and closing of a door of a tailgate cart. Owing to the non-linear response required to match the lateral force component of the gravity vector of the door, the two springs are designed to provide a matching response.

The apparatus is comprised of a tubular housing, or housings, for containing the two, first and second springs. The housing is anchored to the top of the frame of the tailgate cart. The two springs are free to expand or contract within the housing(s). The first and second springs are connected to each other in seriatim, at their distal ends by a first cable. The first cable wraps about a first pulley that is fixed about the housing, but is rotationally free to convey the moving first cable between the springs.

A second pulley is rotationally fixed to the housing or frame, and allows for movement of a second cable attached to the remaining distal end of the first spring. The second cable is attached to the tailgate door via a chain and clip. The second cable and chain is in tension with respect to the tubular housing and frame.

As the tailgate door is lowered from its fully erect position, the first spring of the apparatus is caused to expand. At the moment that the first spring is fully stretched, the second spring stretches to accommodate the load until the top of the tailgate door contacts the ground.

The process is reversed as the tailgate door is lifted from the floor, and back into place, i.e. into its fully upright position.

It is an object of the present invention to provide an improved tailgate door assist device.

It is another object of the current invention to provide a tailgate door assist device that provides a non-linear response with respect to the movement of the tailgate door.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, an apparatus for assisting with the handling of a door of a tailgate cart, is described. The apparatus features two springs that are strung in seriatim. The first spring is connected at one end to the tailgate door, and connects to the second spring at its other end. The second spring is anchored at a distal end to the frame of the tailgate cart. The first spring has a shorter length than the second spring. As the tailgate door is pivotally lowered from its upright position, the shorter spring provides a matching small force. As the tailgate door reaches the end of its travel, the second spring adds its force to the first spring, and a greater force is provided to counterbalance the door.

Figure 1:
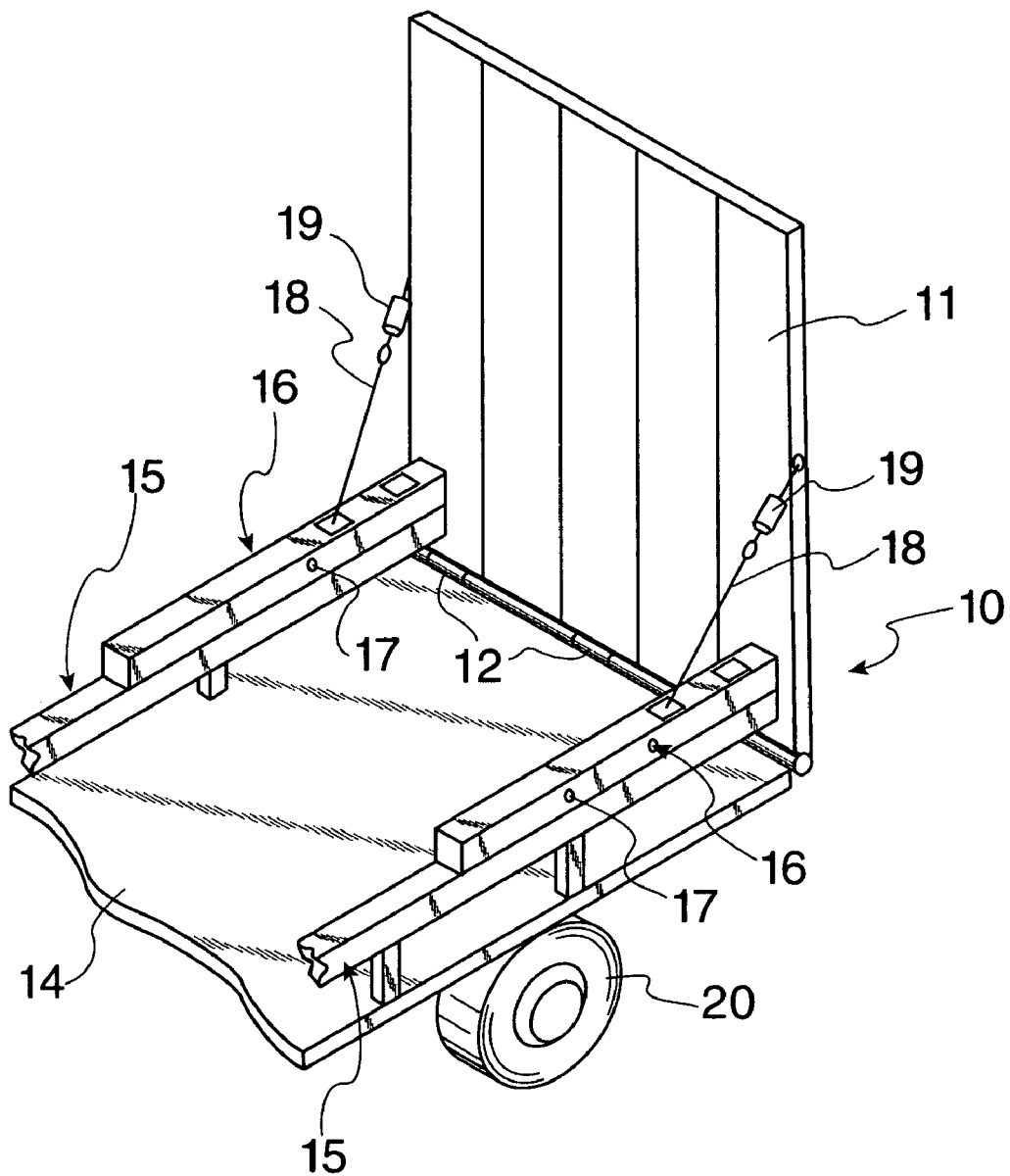
FIG. 1 illustrates a perspective, partial view of a prior art tailgate cart and a pair of assist devices mounted thereupon.

Now referring to FIG. 1, a tailgate cart 10 is shown. The tailgate cart 10 is generally comprises of a large, upright, tailgate door 11, which is pivotally hinged via hinges 12 to the tailgate bed 14. The cart 10 is supported for transportation, upon inflated tires 20 (only one shown here). Twin frame sections 15 extend upwardly from the sides of the bed 14. Two prior art assist devices 16 are attached to the top portion of the frame sections 15, as shown. The assist devices 16 comprise a housing 17 containing a coiled spring (not shown) anchored inside. Two respective cables 18 are attached at one end to the coiled springs contained within the housings 17. The respective cables 18 are each attached at their other end to the tailgate door 11, via two respective turnbuckles 19, which adjust the tension in the cables 18, respectively.

The springs contained in housings 17 are generally identical, and provide a parallel counterbalancing force to the pivotal movement of door 11.

Figure 2:
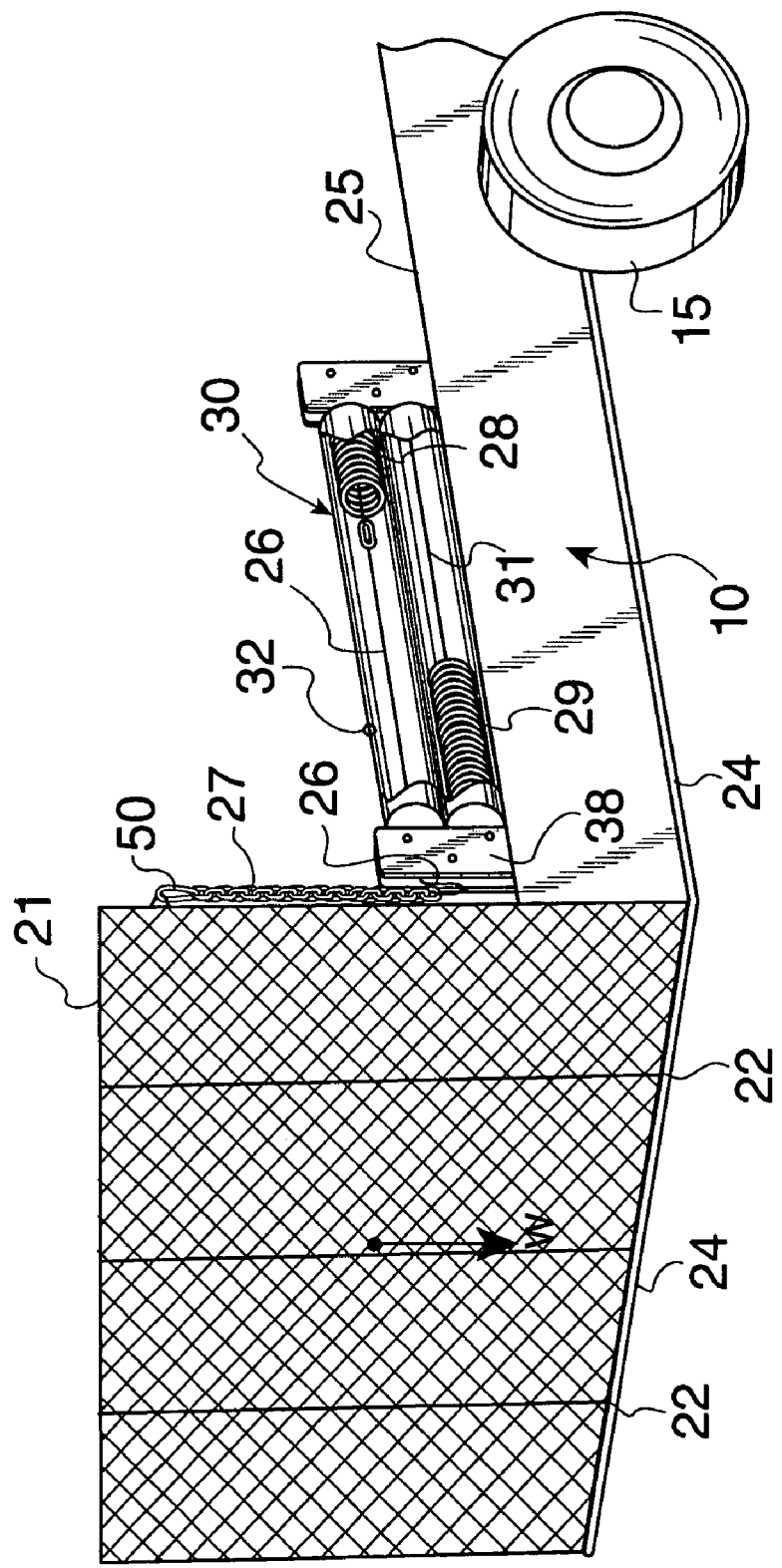
FIG. 2 depicts a partial, perspective, in situ schematic view of the tailgate door assist device of this invention, with the tailgate door in the upright position.

Now referring to FIG. 2, the tailgate cart 10 is shown in schematic with a latticed tailgate door 21 that is pivotally hinged to the bed 24 of the tailgate cart 10 via hinges 24. Twin frames 25 (only one schematically shown) projects upright from each side of the bed 24.

Figure 4:
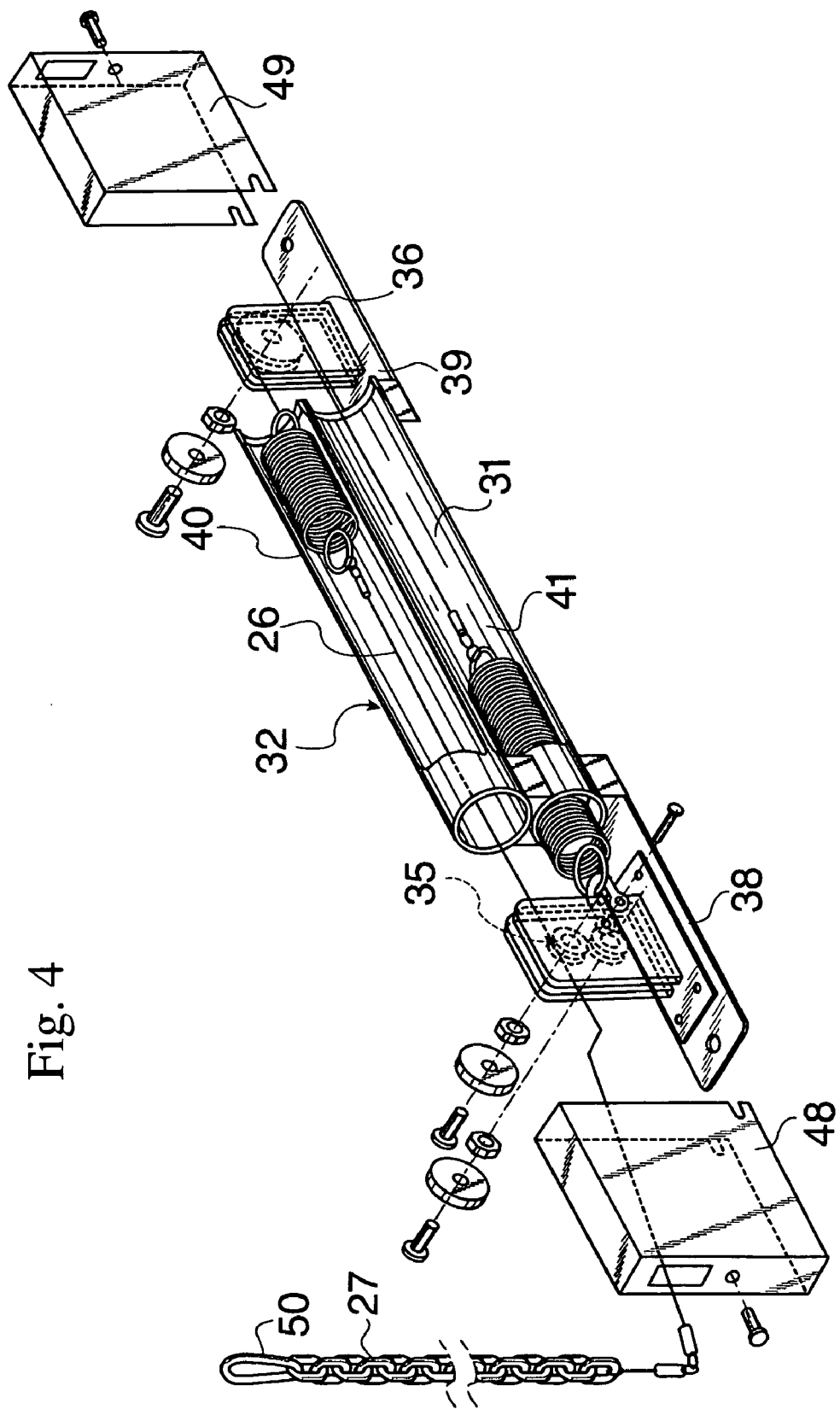
FIG. 4 illustrates an exploded, schematic view of the tailgate door assist device of this invention.
Figure 5:
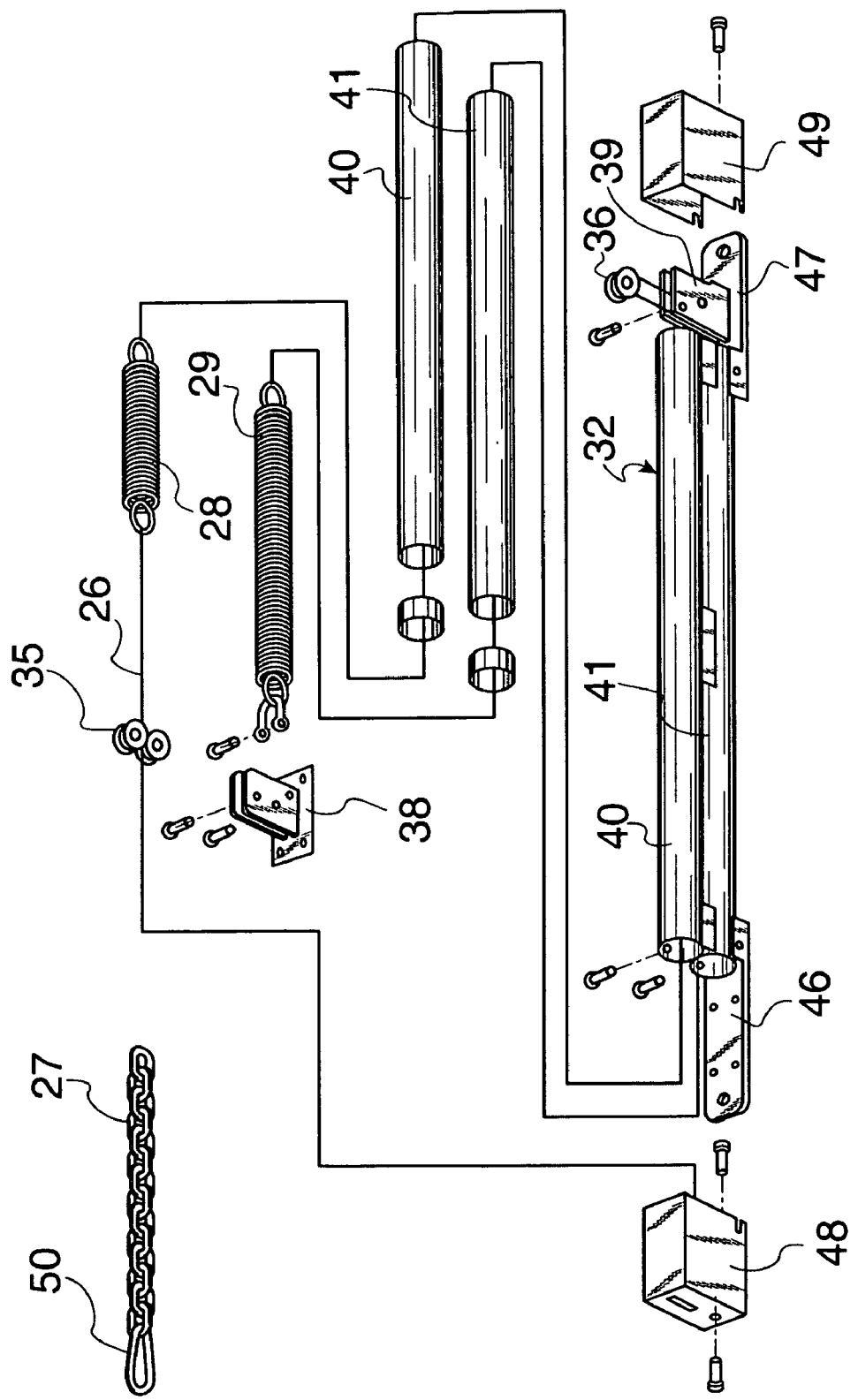
FIG. 5 depicts an alternate exploded view.

The apparatus 30 of this invention is shown mounted on top of one of the side frames 25. The tailgate door 21 is depicted in an upright position. The door 21 is linked to apparatus 30 via a cable 26 and a chain 27. The cable 26 feeds into the housing 32 and connects to a first coiled spring 28. The coiled spring 28 connects to a second coiled spring 29, via cable 31. Both respective cables 26 and 31 are guided through the housing 32 via respective pulley systems 35 and 36, as shown in FIG. 4. The chain 27 is kept taught as it is attached to the tailgate door 21 via clip 50, thus fully stretching cable 26 about a first pulley set 35 disposed within pulley perch 38. The housing 32 comprises tubular cylinders 40 and 41, respectively, as shown in FIGS. 4 and 5. The cylinders 40 and 41 respectively house first coiled spring 28, and second coiled spring 29, as shown in perspective detail in FIG. 5.

Figure 3:
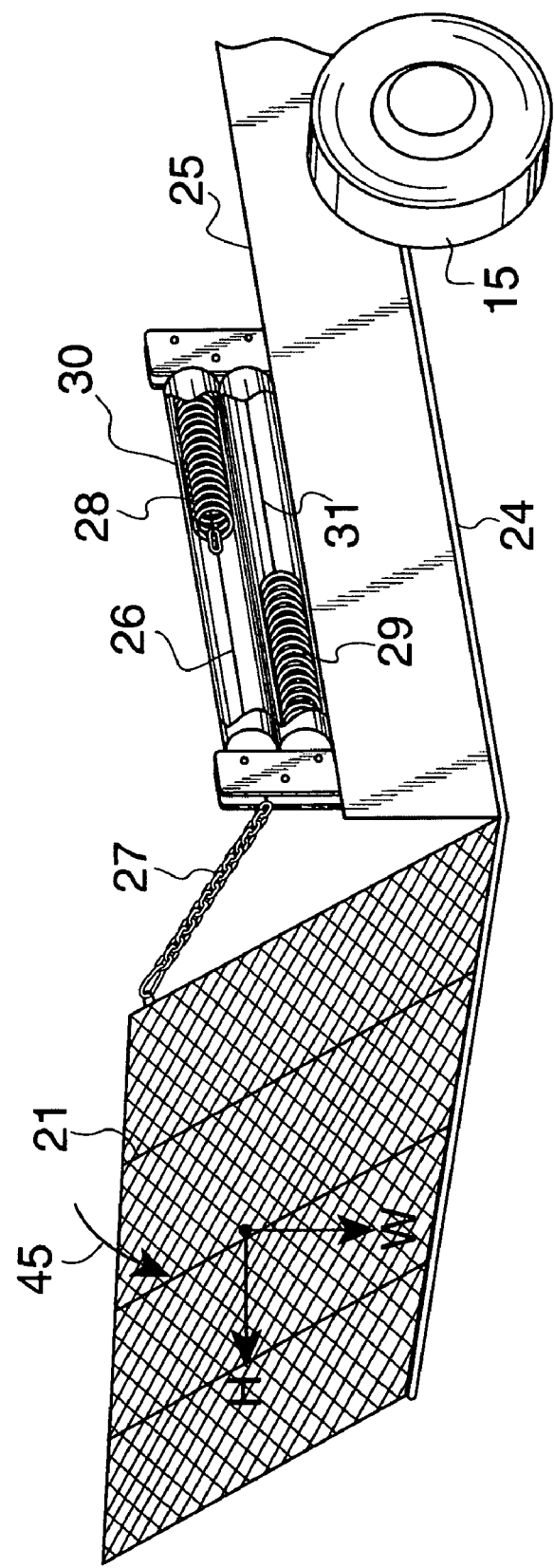
FIG. 3 shows the partial, perspective, in situ schematic view of the tailgate door assist device of FIG. 2 with the tailgate door in a half-way open position.

Now referring to FIGS. 2 and 3, it is observed that the horizontal force component $H_F$ of the weight W of the door 21, is zero when the door 21 is in its initial upright position in FIG. 2. As the tailgate door 21 is lowered, as shown in FIG. 3, the horizontal force component $H_F$ starts to increase causing the first spring 28 to begin to stretch. As the tailgate door 21 continues to descend (arrow 45), the horizontal force $H_F$ is increasingly strong. As the first spring 28 becomes fully stretched, the second spring 29 lends its force to support the counterbalancing of the door force. An alternate embodiment of the counterbalance system, would feature two springs as shown, but with the first spring having a lower spring constant K, than the second spring.

Referring again to FIGS. 4 and 5, the housing 32 comprises the twin tubular elements 40 and 41, that contain the expanding and contracting springs 28 and 29, respectively. The housing 32 is anchored or affixed to the top of the frame 25, as previously mentioned, by two flanges 46 and 47, respectively. The pulley perches 38 and 39 are respectively, supported by flanges 46 and 47. Pulley perch 38 rotationally supports twin pulleys 35 that guide cable 26, and the pulley perch 39 rotationally supports single pulley 36 that guides the movement of cable 31. Housings 48 and 49 protect the pulley perches 38 and 39, respectively.

Since other modifications and changes varied to fit particular operating requirements and environments will be apparent to the skilled practitioner of this art, the invention is not considered limited to the example given for purposes of disclosure, but rather is deemed to cover all changes and modifications which do not constitute departures from the true spirit and scope of the invention.

Having thus described the invention, what is desired to be protected by Letters Patent is presented in the subsequently appended claims.

What is claimed is:

1. An apparatus for assisting the raising and lowering of a door pivotally attached to a tailgate cart, comprising: a spring system including a first spring movably attached to said door; a second spring movably attached to said first spring in seriatim; and means for movably mounting the first and second springs to said tailgate cart.

2. The apparatus in accordance with claim 1, wherein said first spring is shorter in length than said second spring.

3. The apparatus in accordance with claim 1, wherein said first spring has a different spring constant than said second spring.

4. The apparatus in accordance with claim 1, wherein said spring system provides a non-linear response to movement of said door.

5. The apparatus in accordance with claim 1, wherein said first spring and said second spring are each coiled springs, respectively.

6. The apparatus in accordance with claim 1, wherein said first spring and said second spring are each connected to each other by a cable, and further comprising a pulley disposed between said first and second springs for rotationally supporting movement of said cable as said springs expand and contract.

7. The apparatus in accordance with claim 1, wherein said first spring and said second spring are each supported within a tubular housing.

8. An apparatus for assisting the raising and lowering of a tailgate door pivotally attached to a bed of a tailgate cart, comprising: a dual spring system supported by a frame of said tailgate cart, said dual spring system including two springs connected in tandem via a cable that is supported for movement about an intermediately placed pulley; and means for attaching said first spring to said tailgate door.

9. The apparatus in accordance with claim 8, wherein said first spring is shorter in length than said second spring.

10. The apparatus in accordance with claim 8, wherein said first spring has a different spring constant than said second spring.

11. The apparatus in accordance with claim 8, wherein said dual spring system provides a non-linear response to movement of said door.

12. The apparatus in accordance with claim 8, wherein said first spring and said second spring are each coiled springs, respectively.

13. The apparatus in accordance with claim 8, wherein said first spring and said second spring are each supported within a tubular housing.

14. An apparatus for assisting the raising and lowering of a door pivotally attached to a tailgate cart, comprising: a dual spring system including a first coiled spring movably attached to said door; a second coiled spring movably attached to said first coiled spring in tandem; each of said first and second coiled springs being movably supported within a tubular housing that is supported by said tailgate cart.

15. The apparatus in accordance with claim 14, wherein said first coiled spring is shorter in length than said second coiled spring.

16. The apparatus in accordance with claim 14, wherein said first coiled spring has a different spring constant than said second coiled spring.

17. The apparatus in accordance with claim 14, wherein said dual spring system provides a non-linear response to movement of said door.

18. The apparatus in accordance with claim 14, wherein said spring system is mounted upon a frame of said tailgate cart.

\* \* \* \* \*